US012576630B2

(12) United States Patent
Louie et al.

(10) Patent No.: US 12,576,630 B2
(45) Date of Patent: Mar. 17, 2026

(54) COMPOSITE LAMINATION SYSTEM AND METHODS

(71) Applicant: The Boeing Company, Arlington, VA (US)

(72) Inventors: Michael Kenneth-Que Louie, Renton, WA (US); Matthew H. Mellin, Seattle, WA (US)

(73) Assignee: The Boeing Company, Arlington, VA (US)

( * ) Notice: Subject to any disclaimer, the term of this patent is extended or adjusted under 35 U.S.C. 154(b) by 325 days.

(21) Appl. No.: 18/353,660

(22) Filed: Jul. 17, 2023

(65) Prior Publication Data

US 2025/0026122 A1　　Jan. 23, 2025

(51) Int. Cl.
B32B 41/00 (2006.01)

(52) U.S. Cl.
CPC .......... B32B 41/00 (2013.01); B32B 2041/06 (2013.01)

(58) Field of Classification Search
CPC ..... B32B 41/00; B32B 2041/06; B29C 70/30; G01B 11/245; G01S 17/86; G01S 17/42; G01S 17/66; G01S 17/88
See application file for complete search history.

(56) References Cited

U.S. PATENT DOCUMENTS

| | | |
|---|---|---|
| 6,971,175 B2 | 12/2005 | Savoy et al. |
| 7,194,326 B2 | 3/2007 | Cobb et al. |
| 10,732,284 B2 | 8/2020 | Wingert et al. |
| 11,568,597 B2 | 1/2023 | ReMine et al. |
| 2009/0043533 A1* | 2/2009 | Brennan ............... B29C 70/386 |
| | | 702/152 |
| 2012/0330453 A1 | 12/2012 | Samak et al. |
| 2017/0113422 A1 | 4/2017 | Maass et al. |
| 2022/0118624 A1 | 4/2022 | Tyson |
| 2022/0155754 A1 | 5/2022 | Erickson et al. |
| 2022/0193903 A1 | 6/2022 | Ingram et al. |
| 2023/0173748 A1 | 6/2023 | Johnson et al. |

FOREIGN PATENT DOCUMENTS

EP　　　4000895 A1　　5/2022

OTHER PUBLICATIONS

Extended European Search Report, dated Dec. 13, 2024, regarding EP Application No. 24184202, 12 pages.

* cited by examiner

*Primary Examiner* — Stephen D Meier
*Assistant Examiner* — Quang X Nguyen
(74) *Attorney, Agent, or Firm* — Yee & Associates, P.C.

(57) ABSTRACT

A system and methods for indexing an automated fiber placement head to a surface of a substrate are provided. The system comprises a first measurement system comprising a first plurality of sensors configured to scan the surface of the substrate; a second measurement system comprising a second plurality of sensors configured to locate the automated fiber placement head; and a data management device configured to generate a full resolution transformation using measurements from the first measurement system and determine a position of the automated fiber placement head using data from the second measurement system.

23 Claims, 7 Drawing Sheets

700

| | |
|---|---|
| 702 | SPECIFICATION AND DESIGN |
| 704 | MATERIAL PROCUREMENT |
| 706 | COMPONENT AND SUBASSEMBLY MANUFACTURING |
| 708 | SYSTEM INTEGRATION |
| 710 | CERTIFICATION AND DELIVERY |
| 712 | IN SERVICE |
| 714 | MAINTENANCE AND SERVICE |

800

AIRCRAFT

802 — AIRFRAME     INTERIOR — 806

SYSTEMS

PROPULSION SYSTEM     ELECTRICAL SYSTEM 808   812

810   814

HYDRAULIC SYSTEM     ENVIRONMENTAL SYSTEM

804

COMPOSITE LAMINATION SYSTEM AND METHODS

BACKGROUND INFORMATION

1. Field

The present disclosure relates generally to manufacturing and more specifically to composite lamination.

2. Background

In manufacturing composite structures, layers of composite material are typically laid up on a mandrel or other. The layers may be laid up in the form of tape, tows, or other suitable forms. In some cases, resin may be infused or pre-impregnated into the fiber layers. Composite materials with resin pre-impregnated are commonly referred to as prepreg.

The different layers of prepreg may be laid up in different orientations and different numbers of layers may be used depending on the thickness of the composite structure being manufactured. These layers may be laid up using automated lamination equipment such as a tape laminating machine or a fiber placement system.

Composite lamination involves some variations. The variations can compound in the layers of composite material. Laps, gaps, or other inconsistencies can result in the composite part due to variations.

Therefore, it would be desirable to have a method and apparatus that takes into account at least some of the issues discussed above, as well as other possible issues.

SUMMARY

An embodiment of the present disclosure provides a system for indexing an automated fiber placement head to a surface of a substrate. The system comprising a first measurement system comprising a first plurality of sensors configured to scan the surface of the substrate, a second measurement system comprising a second plurality of sensors configured to locate the automated fiber placement head, and a data management device configured to generate a full resolution transformation using measurements from the first measurement system and determine a position of the automated fiber placement head using data from the second measurement system.

Another embodiment of the present disclosure provides a method of performing composite lamination. An initial mandrel scan of a substrate within a manufacturing environment is performed using a first measurement system. A position of an automated fiber placement head within the manufacturing environment is determined using a second measurement system. A full resolution transformation is generated using results from the initial mandrel scan. Layup on the substrate is begun by the automated fiber placement head based on the full resolution transformation and the position.

Another embodiment of the present disclosure provides a method of performing composite lamination. A surface of a substrate is scanned to generate first measurements using a first plurality of sensors. An automated fiber placement head is located using a second plurality of sensors. The automated fiber placement head is indexed to the substrate based on the first measurements. Composite material is laid up on the surface of the substrate using the automated fiber placement head after indexing the automated fiber placement head.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account several considerations. For example, the illustrative examples recognize and take into account that currently probing is performed on a mandrel prior to laying up composite material. The illustrative examples recognize and take into account that probing can take more than an hour on large parts. The illustrative examples recognize and take into account that probing only provides data at probe points. Probe points have spacing between each point. In some examples, the distance between probe points is between four and eight feet. In some examples, there can be up to fifty probe points for a large tool. Currently linear interpolations (transforms) occur between the probe points.

The illustrative examples recognize and take into account that increasing accuracy of composite material layup will reduce defects. The illustrative examples provide a system and methods that will reduce or eliminate linear interpolation of the mandrel. The illustrative examples increase the accuracy of composite layup by increasing the accuracy of measurements of the mandrel. The illustrative examples provide accuracy to at least 0.010". The illustrative examples provide accuracy of a value sufficient to reduce or prevent gaps and laps in composite material laid up on the radii of the mandrel.

Figure 1:
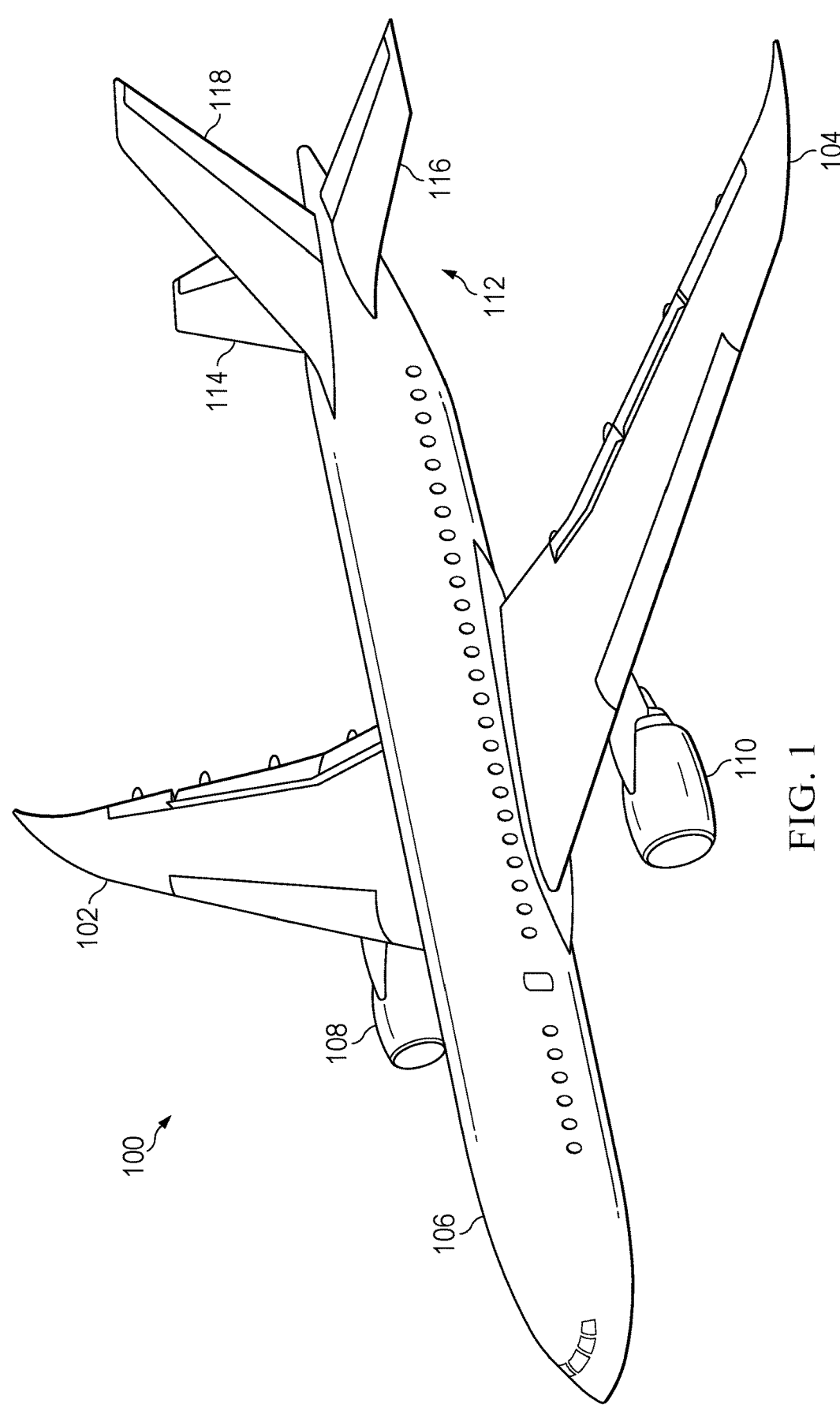
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft that can have composite parts laid up using the illustrative examples. Aircraft 100 is an example of an aircraft with a spar, a stiffener, or other composite part laid up using a method of the illustrative examples. Aircraft 100 is an example of an aircraft with a spar, a stiffener, or other composite part laid up using a system of the illustrative examples.

Figure 2:
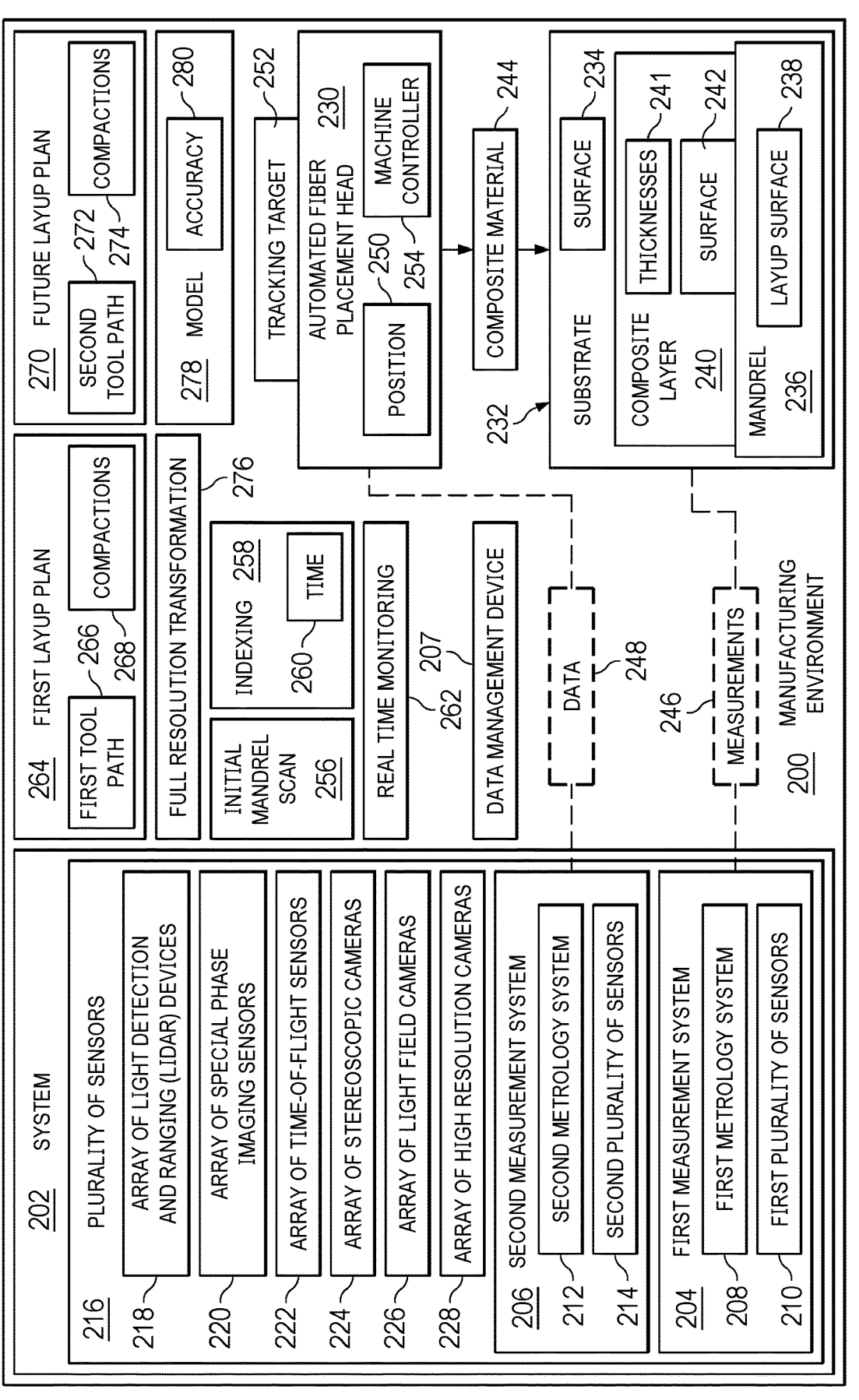
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. System 202 in manufacturing environment 200 can be used to layup a composite part of aircraft 100 of FIG. 1.

System 202 can be used for indexing 258 automated fiber placement head 230 to surface 234 of substrate 232. System 202 comprises first measurement system 204, second measurement system 206, and data management device 207. First measurement system 204 comprises first plurality of sensors 210 configured to scan surface 234 of substrate 232. In some illustrative examples, first measurement system 204 can be referred to as first metrology system 208.

Second measurement system 206 system comprises second plurality of sensors 214 configured to locate automated fiber placement head 230. In some illustrative examples, second measurement system 206 can be referred to as second metrology system 212. Data management device 207 is configured to generate full resolution transformation 276 using measurements 246 from first measurement system 204 and determine position 250 of automated fiber placement head 230 using data from second measurement system 206.

Unlike conventional probing, full resolution transformation 276 has sufficient measurements 246 provided by first measurement system 204 so that interpolation is not performed. In some illustrative examples, first plurality of sensors 210 is accurate to less than or equal to 0.005 inches. In some illustrative examples, scanning of substrate 232 is performed with a frame rate with an accuracy of 0.010 inches.

In some illustrative examples, first plurality of sensors 210 comprises one or more of array of light detection and ranging (LIDAR) devices 218, array of special phase imaging sensors 220, array of time-of-flight sensors 222, array of stereoscopic cameras 224, array of light field cameras 226, or array of high resolution cameras 228. In some illustrative examples, second plurality of sensors comprises one or more of array of light detection and ranging (LIDAR) devices 218, array of special phase imaging sensors 220, array of time-of-flight sensors 222, array of stereoscopic cameras 224, array of light field cameras 226, or array of high resolution cameras 228.

Substrate 232 can take the form of either mandrel 236 with layup surface 238 or composite layer 240 positioned on mandrel 236. When substrate 232 comprises composite layer 240, first measurement system 204 scans surface 242 of composite layer 240. When substrate 232 is mandrel 236, first measurement system 204 scans layup surface 238 of mandrel 236. In some illustrative examples, composite layer 240 is a partial ply and both surface 242 and exposed portions of layup surface 238 are scanned by first measurement system 204.

First measurement system 204 performs initial mandrel scan 256 on substrate 232. After performing initial mandrel scan 256, full resolution transformation 276 is performed using measurements 246 from initial mandrel scan 256.

Indexing 258 automated fiber placement head 230 to substrate 232 is performed using time 260 considerably less than conventional processes due to initial mandrel scan 256 taking less time than physically probing mandrel 236. Time 260 for indexing 258 can be considerably less than indexing using probing.

In some illustrative examples, second measurement system 206 directly tracks automated fiber placement head 230 in manufacturing environment 200. In some illustrative examples, tracking target 252 is connected to the automated fiber placement head 230. In these illustrative examples, second plurality of sensors 214 is configured to track locations of tracking target 252. For example, tracking target 252 can be a reflector.

In some illustrative examples, substrate 232 is a composite layer 240 on a mandrel 236, and data management device 207 is configured to determine thicknesses 241 of composite layer 240 using measurements 246 from the first plurality of sensors 210. In these illustrative examples, thicknesses 241 of composite layer 240 can be used to modify first layup plan 264.

First layup plan 264 comprises first tool path 266 and compactions 268. In some illustrative examples, at least one of first tool path 266 and compactions 268 can be modified based on thicknesses 241 of composite layer 240. By modifying first layup plan 264, build-up of inconsistencies in a composite part can be reduced or prevented. By modifying first layup plan 264, additional inconsistencies in a composite part can be reduced.

In some illustrative examples, substrate 232 is composite layer 240 on mandrel 236, and data management device 207 is configured to form model 278 of composite layer 240 near real-time to generation of measurements 246 by first measurement system 204. By forming model 278 near real-time to generation of measurements 246, model 278 can be used in real time monitoring 262. In some illustrative examples, accuracy 280 of model 278 of composite layer 240 is within about 0.005 inches to composite layer 240. In some illustrative examples, future layup plan 270 is modified based on model 278.

In some illustrative examples, substrate 232 is mandrel 236, and data management device 207 is further configured to index automated fiber placement head 230 to mandrel 236 using the full resolution transformation 276 and position 250 of automated fiber placement head 230. In some illustrative examples, data 248 from second measurement system 206 has higher accuracy than the accuracy of machine controller 254.

In some illustrative examples, first measurement system 204 is configured to perform both indexing 258 and real time monitoring 262. In real time monitoring 262, measurements 246 can be taken of composite material 244 laid down by automated fiber placement head 230 as composite material 244 on substrate 232. In some illustrative examples, composite material 244 can be used to modify future layup plan 270.

Future layup plan 270 comprises second tool path 272 and compactions 274. In some illustrative examples, at least one of second tool path 272 and compactions 274 can be modified based on the layup of composite material 244. By modifying future layup plan 270, build-up of inconsistencies in a composite part can be reduced or prevented. By modifying future layup plan 270, additional inconsistencies in a composite part can be reduced.

In some illustrative examples, second measurement system 206 is configured to perform real time monitoring 262. Real time monitoring 262 of automated fiber placement head 230 can continually track position 250 of automated fiber placement head 230. Real time monitoring 262 of automated fiber placement head 230 can have a higher accuracy than tracking by machine controller 254 of automated fiber placement head 230.

In some illustrative examples, system 202 can be described as comprising plurality of sensors 216 configured to perform initial mandrel scan 256 and locate automated fiber placement head 230. In these illustrative examples, first plurality of sensors 210 and second plurality of sensors 214 are sensors within sensors 216.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

In some illustrative examples, multiple sequential layers of composite material can be laid down on mandrel 236. In some illustrative examples, additional layup plans are present for laying up the additional composite material layers on mandrel 236.

Figure 3:
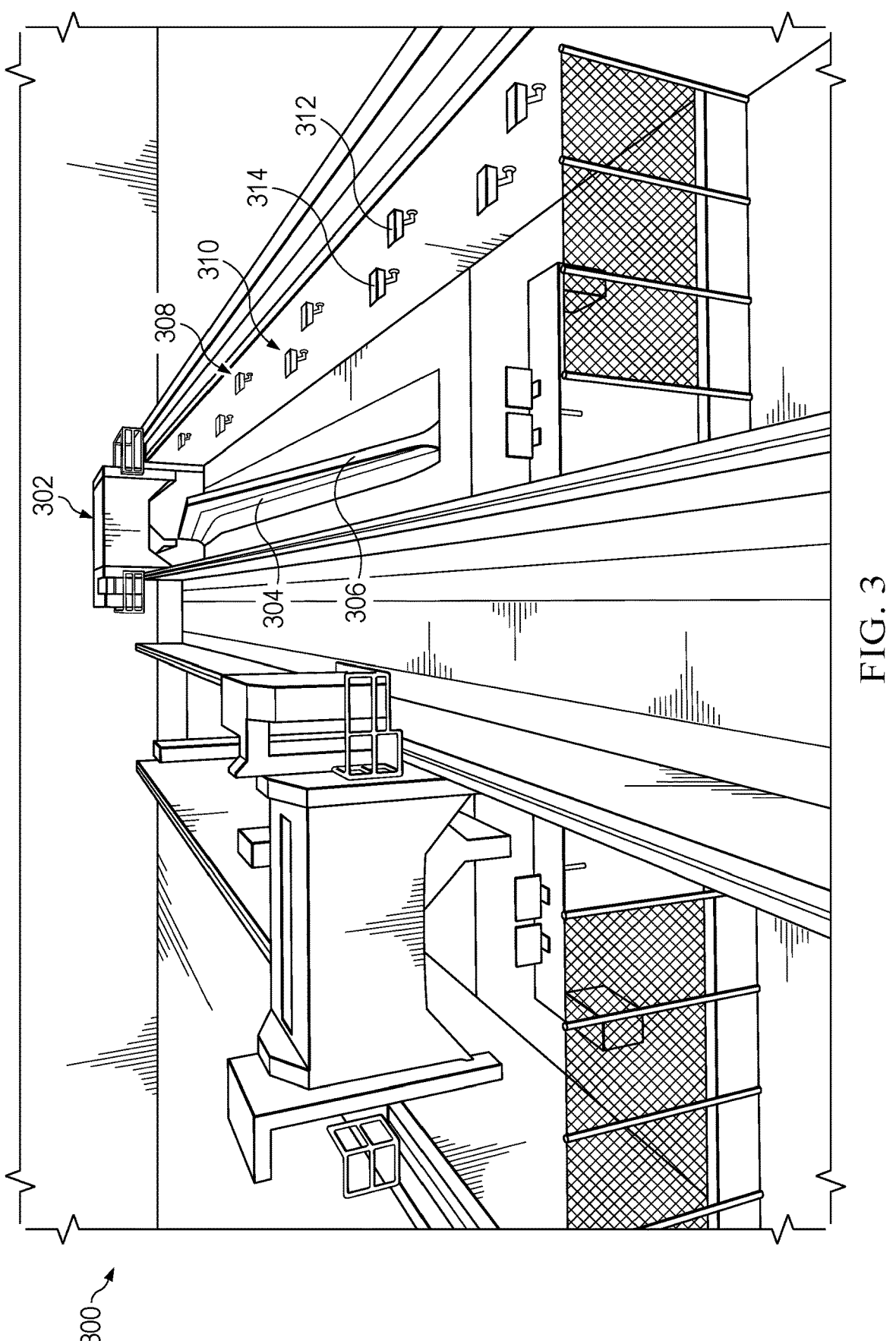
FIG. 3 is an illustration of an isometric view of a manufacturing environment in accordance with an illustrative embodiment.

Turning now to FIG. 3, an illustration of an isometric view of a manufacturing environment is depicted in accordance with an illustrative embodiment. Manufacturing environment 300 is a physical implementation of manufacturing environment 200 of FIG. 2. Portions of aircraft 100 can be manufactured in manufacturing environment 300.

Automated fiber placement head 302 is present in manufacturing environment 300. Automated fiber placement head 302 is configured to lay down composite material on a substrate, such as substrate 304. In this illustrative example, substrate 304 takes the form of mandrel 306.

First measurement system 308 and second measurement system 310 are present in manufacturing environment 300. First measurement system 308 and second measurement system 310 can be used to increase accuracy of composite material layup on substrate 304. First measurement system 308 can be used for indexing automated fiber placement head 302 to mandrel 306. First measurement system 308 can be used for real time monitoring of the composite material laid up on mandrel 306.

Second measurement system 310 is configured to determine a position of automated fiber placement head 302. Second measurement system 310 can be used for indexing automated fiber placement head 302 to mandrel 306 prior to laying down composite material. In some illustrative examples, second measurement system 310 can be used for real time monitoring of automated fiber placement head 302.

First measurement system 308 comprises first plurality of sensors 312 configured to scan the surface of substrate 304. First plurality of sensors 312 comprises one or more of an array of light detection and ranging (LIDAR) devices, an array of special phase imaging sensors, an array of time-of-flight sensors, an array of stereoscopic cameras, an array of light field cameras, or an array of high resolution cameras. Second measurement system 310 comprises second plurality of sensors 314 configured to locate automated fiber placement head 302. Second plurality of sensors 314 comprises one or more of an array of light detection and ranging (LIDAR) devices, an array of special phase imaging sensors, an array of time-of-flight sensors, an array of stereoscopic cameras, an array of light field cameras, or an array of high resolution cameras.

Figure 4:
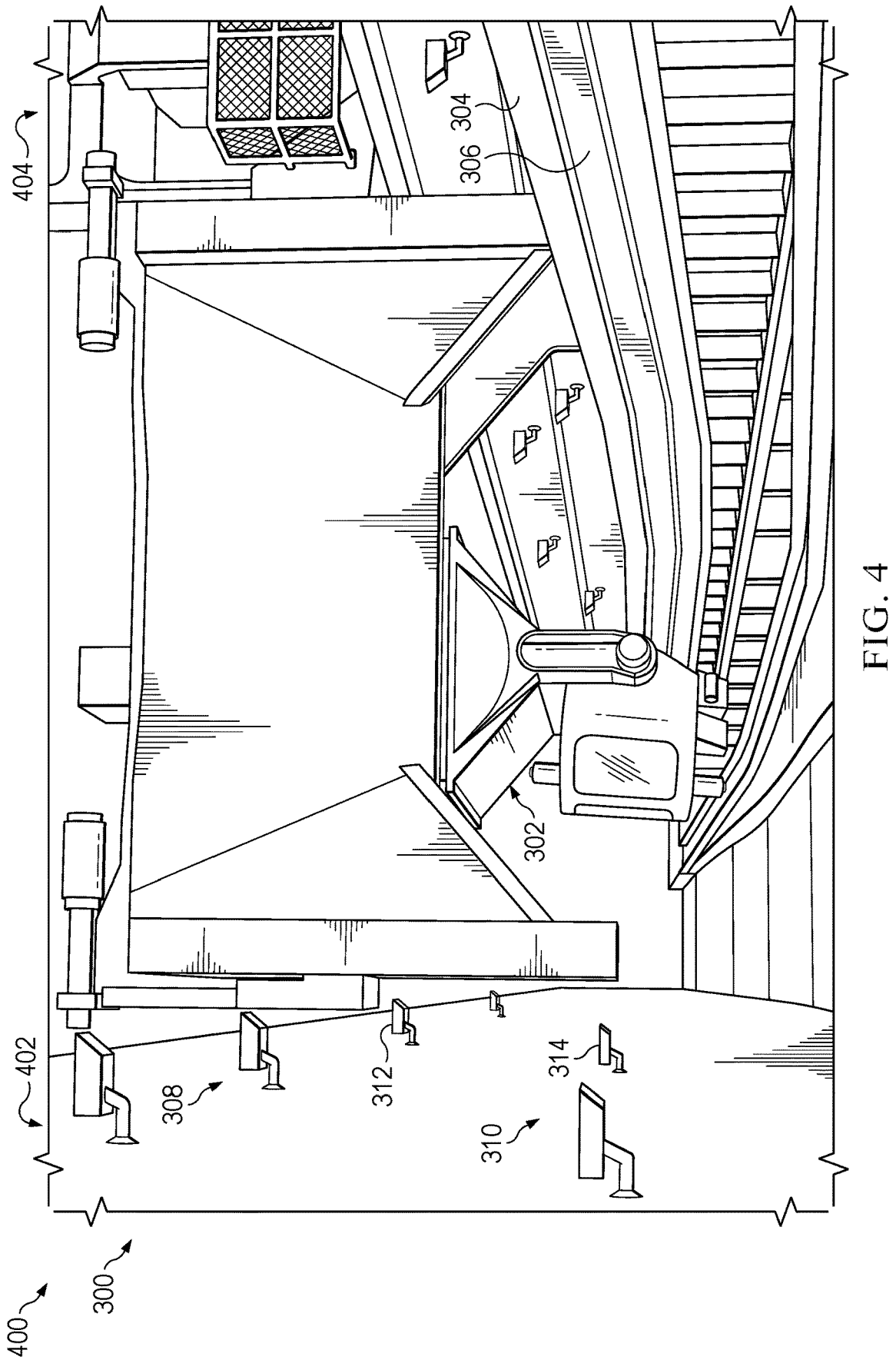
FIG. 4 is an illustration of a first measuring system and a second measuring system in a manufacturing environment in accordance with an illustrative embodiment.

Turning now to FIG. 4, an illustration of a first measuring system and a second measuring system in a manufacturing environment is depicted in accordance with an illustrative embodiment. In view 400, first plurality of sensors 312 of first measurement system 308 and second plurality of sensors 314 of second measurement system 310 are depicted from a longitudinal direction of mandrel 306. As can be seen in view 400, first plurality of sensors 312 and second plurality of sensors 314 are distributed along a length of substrate 304. By distributing first plurality of sensors 312 along a length of substrate 304, the entirety of substrate 304 can be scanned. By distributing first plurality of sensors 312 along the length of substrate 304, the accuracy of indexing is greater than probing as discrete locations and performing interpolations.

By distributing second plurality of sensors 314 along the length of substrate 304, automated fiber placement head 302 can be located at any processing location within manufacturing environment 300. By distributing second plurality of sensors 314 along the length of substrate 304, second plurality of sensors 314 can be used for initial indexing as well as real time monitoring of automated fiber placement head 302 along the length of substrate 304.

As can be seen in view 400, first plurality of sensors 312 and second plurality of sensors 314 are distributed on two sides of substrate 304. In view 400, first plurality of sensors 312 and second plurality of sensors 314 are distributed on side wall 402 and side wall 404. As depicted, substrate 304 is positioned between side wall 402 and side wall 404 and automated fiber placement head 302 moves in between side wall 402 and side wall 404 to layup composite material on substrate 304.

Although first plurality of sensors 312 and second plurality of sensors 314 are depicted as mounted directly to side wall 402 and side wall 404, first plurality of sensors 312 and second plurality of sensors 314 can be mounted in other ways. In some illustrative examples, at least one sensor of at least one of first plurality of sensors 312 and second plurality of sensors 314 can be mounted to a stand between side wall 402 and side wall 404.

Figure 5:
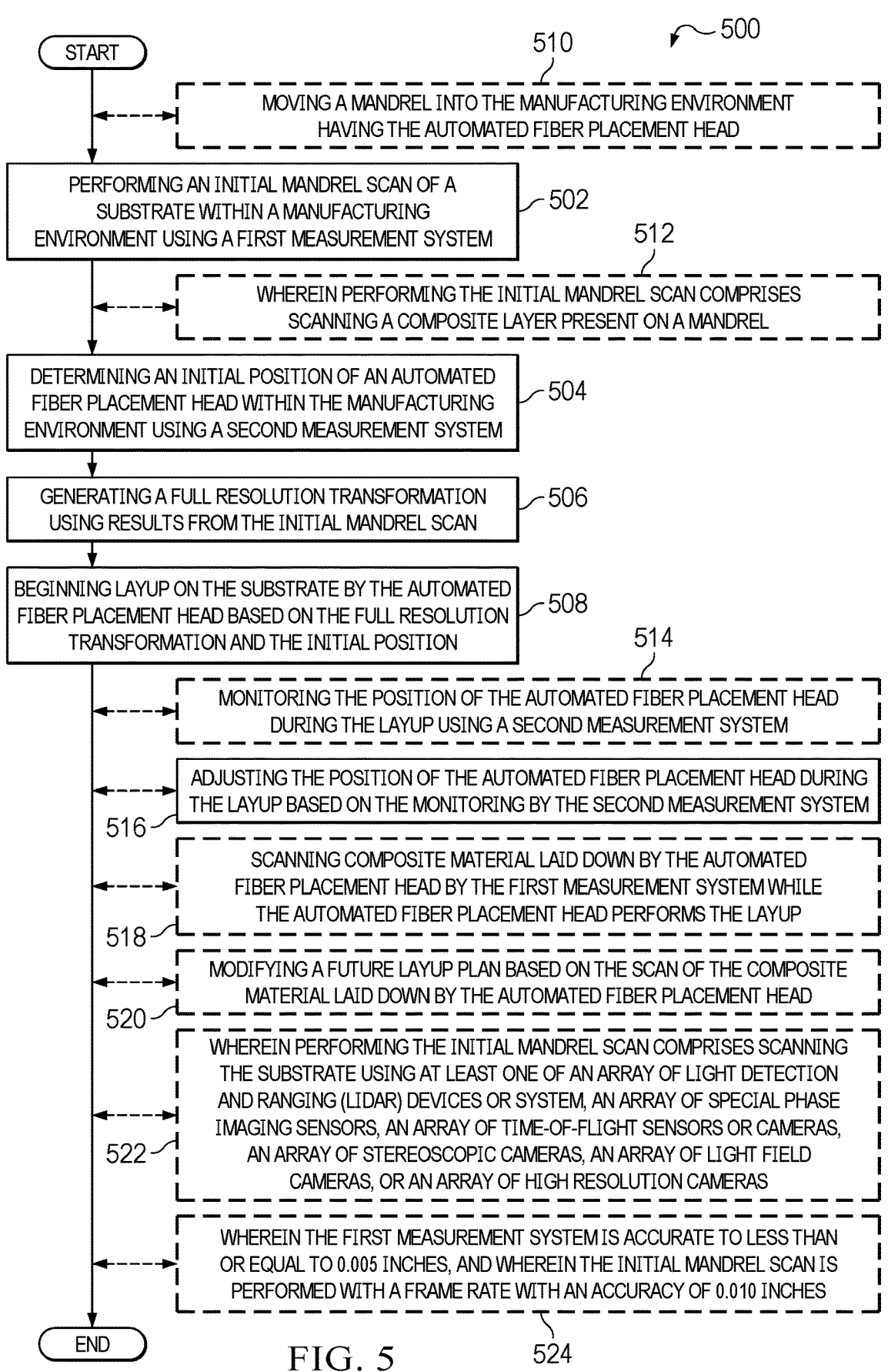
FIG. 5 is a flowchart of a method of performing composite lamination in accordance with an illustrative embodiment.

Turning now to FIG. 5, a flowchart of a method of performing composite lamination is depicted in accordance with an illustrative embodiment. Method 500 can be used to layup a composite part of aircraft 100 of FIG. 1. Method 500 can be implemented using system 202 in manufacturing environment 200 of FIG. 2. Method 500 can be implemented using first measurement system 308 and second measurement system 310 in manufacturing environment 300 of FIGS. 3 and 4.

Method 500 performs an initial mandrel scan of a substrate within a manufacturing environment using a first measurement system (operation 502). Method 500 determines a position of an automated fiber placement head within the manufacturing environment using a second measurement system (operation 504). Method 500 generates a full resolution transformation using results from the initial mandrel scan (operation 506). Method 500 begins a layup on the substrate by the automated fiber placement head based on the full resolution transformation and the position (operation 508). Afterwards, method 500 terminates.

In some illustrative examples, method 500 comprises moving the mandrel into the manufacturing environment having the automated fiber placement head (operation 510).

In some illustrative examples, performing the initial mandrel scan comprises scanning a surface of the mandrel.

In some illustrative examples, performing the initial mandrel scan comprises scanning a composite layer present on a mandrel (operation 512). In some illustrative examples, performing the initial mandrel scan comprises determining a thickness of the composite layer present on the mandrel.

In some illustrative examples, method 500 monitors the position of the automated fiber placement head during the layup using a second measurement system (operation 514). In some illustrative examples, method 500 adjusts the position of the automated fiber placement head during the layup based on the monitoring by the second measurement system (operation 516).

In some illustrative examples, method 500 scans composite material laid down by the automated fiber placement head by the first measurement system while the automated fiber placement head performs the layup (operation 518). In some illustrative examples, by scanning the composite material laid down by the automated fiber placement head during the layup, the composite material can be inspected for any inconsistencies. In some illustrative examples, by scanning the composite material laid down by the automated fiber placement head during the layup, future separate indexing steps can be reduced or eliminated. In some illustrative examples, by scanning the composite material laid down by the automated fiber placement head during the layup, data for the substrate surface comprising the composite material is obtained during processing to reduce downtime.

In some illustrative examples, method 500 modifies a future layup plan based on the scan of the composite material laid down by the automated fiber placement head (operation 520). For example, a future layup plan can be a plan to lay down a subsequent composite material. A future tool path to lay down the subsequent composite material may be modified to take into account the physical layup of the composite material. In these illustrative examples, stack up of inconsistencies in a thickness of a composite layup can be reduced by taking into account the location and dimensions of the as-laid composite material.

In some illustrative examples, performing the initial mandrel scan comprises scanning the substrate using at least one of an array of light detection and ranging (LIDAR) devices, an array of special phase imaging sensors, an array of time-of-flight sensors, an array of stereoscopic cameras, an array of light field cameras, or an array of high resolution cameras (operation 522). In some illustrative examples, the first measurement system is accurate to less than or equal to 0.005 inches, and wherein the initial mandrel scan is performed with a frame rate with an accuracy of 0.010 inches (operation 524).

Figure 6:
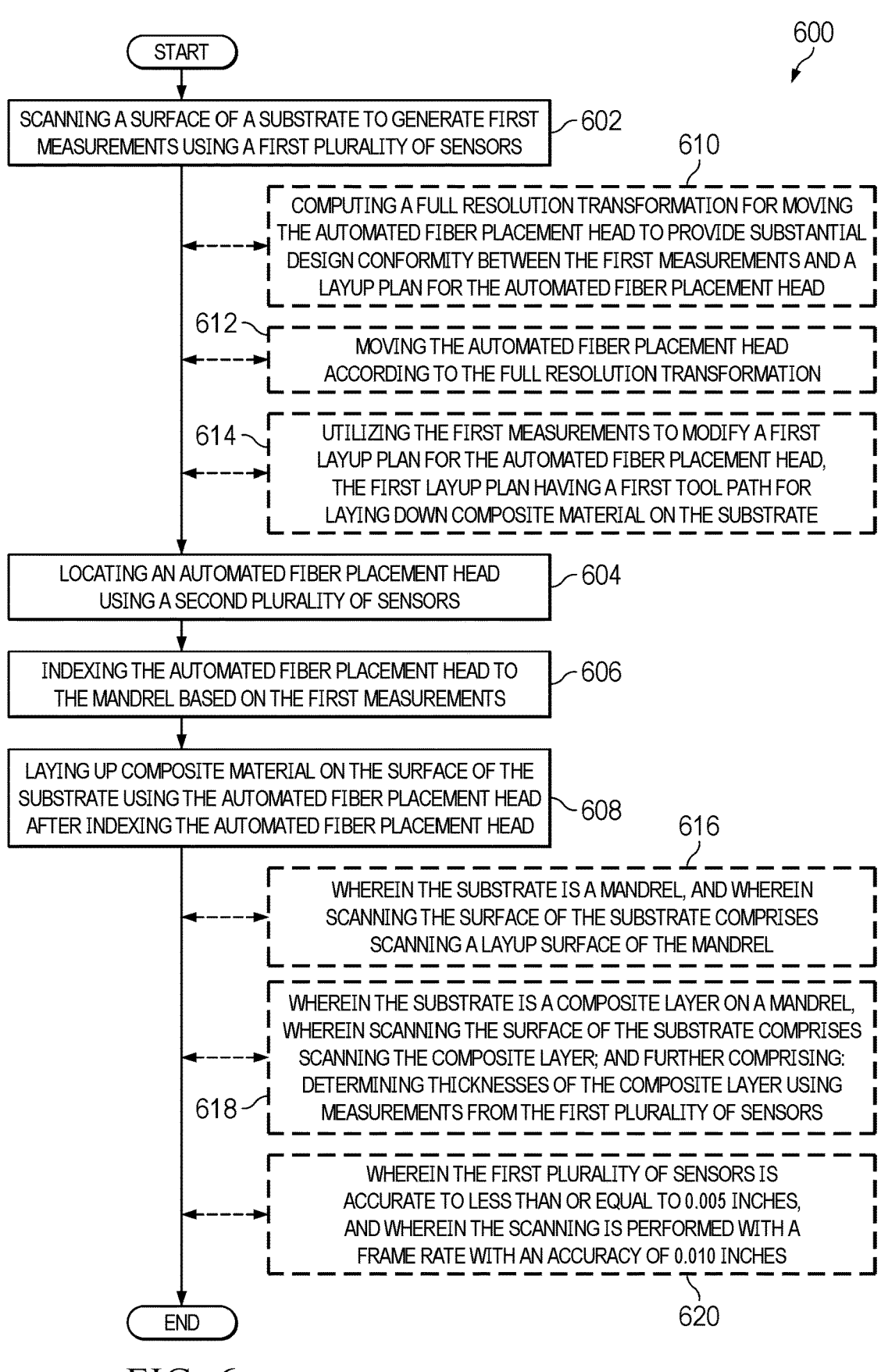
FIG. 6 is a flowchart of a method of performing composite lamination in accordance with an illustrative embodiment.

Turning now to FIG. 6, a flowchart of a method of performing composite lamination is depicted in accordance with an illustrative embodiment. Method 600 can be used to layup a composite part of aircraft 100 of FIG. 1. Method 600 can be implemented using system 202 in manufacturing environment 200 of FIG. 2. Method 600 can be implemented using first measurement system 308 and second measurement system 310 in manufacturing environment 300 of FIGS. 3 and 4.

Method 600 scans a surface of a substrate to generate first measurements using a first plurality of sensors (operation 602). Method 600 locates an automated fiber placement head using a second plurality of sensors (operation 604). Method 600 indexes the automated fiber placement head to the substrate based on the first measurements (operation 606). Method 600 lays up composite material on the surface of the substrate using the automated fiber placement head after indexing the automated fiber placement head (operation 608). Afterwards, method 600 terminates.

In some illustrative examples, method 600 computes a full resolution transformation for moving the automated fiber placement head to provide substantial design conformity between the first measurements and a layup plan for the automated fiber placement head (operation 610). In some illustrative examples, method 600 moves the automated fiber placement head according to the full resolution transformation (operation 612). In some illustrative examples, method 600 comprises utilizing the first measurements to modify a first layup plan for the automated fiber placement head, the first layup plan having a first tool path for laying down composite material on the substrate (operation 614).

In some illustrative examples, the substrate is a mandrel, and wherein scanning the surface of the substrate comprises scanning a layup surface of the mandrel (operation 616). In some illustrative examples, the substrate is a composite layer on a mandrel, wherein scanning the surface of the substrate comprises scanning the composite layer, and further comprising: determining thicknesses of the composite layer using measurements from the first plurality of sensors (operation 618).

In some illustrative examples, the first plurality of sensors is accurate to less than or equal to 0.005 inches, and wherein the scanning is performed with a frame rate with an accuracy of 0.010 inches (operation 620). By having a desired accuracy, scanning using the first plurality of sensors can be used to increase the quality of a resulting composite part. By having a desired accuracy, the first plurality of sensors can be used to reduce inconsistencies in the resulting composite part.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 510 through operation 524 may be optional. As another example, operation 610 through operation 620 may be optional.

Figures 7, 8:
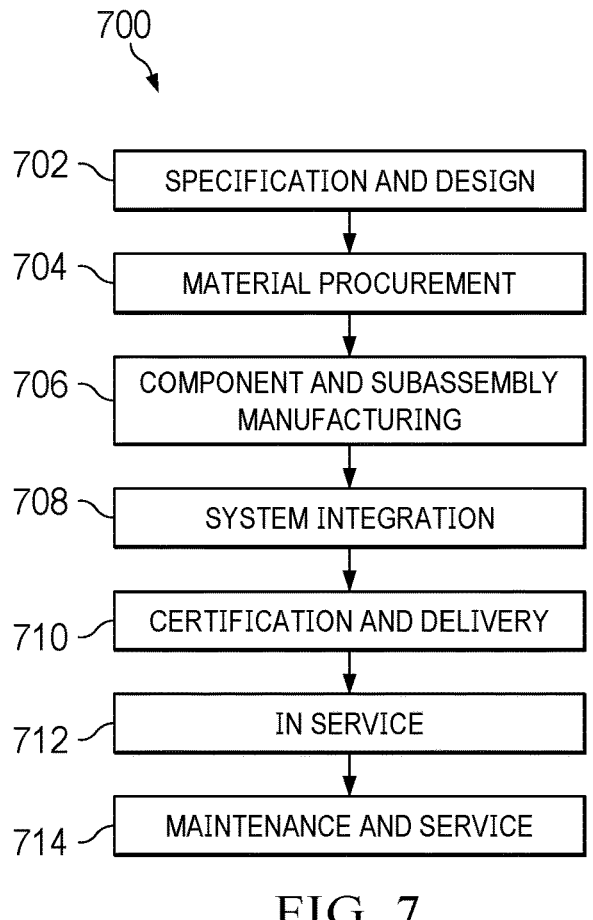
FIG. 7 is an illustration of an aircraft manufacturing and service method in a form of a block diagram in accordance with an illustrative embodiment.
FIG. 8 is an illustration of an aircraft in a form of a block diagram in which an illustrative embodiment may be implemented.

Illustrative embodiments of the present disclosure may be described in the context of aircraft manufacturing and service method 700 as shown in FIG. 7 and aircraft 800 as shown in FIG. 8. Turning first to FIG. 7, an illustration of an aircraft manufacturing and service method in a form of a block diagram is depicted in accordance with an illustrative embodiment. During pre-production, aircraft manufacturing and service method 700 may include specification and design 702 of aircraft 800 in FIG. 8 and material procurement 704.

During production, component and subassembly manufacturing 706 and system integration 708 of aircraft 800 takes place. Thereafter, aircraft 800 may go through certification and delivery 710 in order to be placed in service 712. While in service 712 by a customer, aircraft 800 is scheduled for routine maintenance and service 714, which may include modification, reconfiguration, refurbishment, or other maintenance and service.

Each of the processes of aircraft manufacturing and service method 700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 8, an illustration of an aircraft in a form of a block diagram is depicted in which an illustrative embodiment may be implemented. In this example, aircraft 800 is produced by aircraft manufacturing and service method 700 of FIG. 7 and may include airframe 802 with plurality of systems 804 and interior 806. Examples of systems 804 include one or more of propulsion system 808, electrical system 810, hydraulic system 812, and environmental system 814. Any number of other systems may be included.

Apparatuses and methods embodied herein may be employed during at least one of the stages of aircraft manufacturing and service method 700. One or more illustrative embodiments may be manufactured or used during at least one of component and subassembly manufacturing 706, system integration 708, in service 712, or maintenance and service 714 of FIG. 7.

The illustrative examples present a system and methods for composite lamination. The illustrative examples present better positioning of lamination head relative to contour or cornered parts during lamination and compaction.

The illustrative examples can perform the following method Move Layup Mandrel (LM)—Perform LM and head Scan—Generate full resolution transform—Begin Layup—Adjust lamination head as needed to conform to part. The illustrative examples provide a more accurate and rapid way of constantly indexing the lamination equipment to the layup mandrel and as-is condition of the part. The illustrative examples enable high rate composite manufacturing. The illustrative examples reduce or eliminate probing, which is a time constraint.

For a linear flow fabrication line, multiple indexing operations will be utilized. The illustrative examples enable rapid indexing. In some illustrative examples, the indexing can be performed in approximately 15 minutes.

The illustrative examples provide full mesh resolution and eliminates the need for linear interpretations between probe points. The illustrative examples can continuously monitor in case of any changes during the build (collisions, movement, etc.). Varying levels of compaction for contoured parts affects the nominal surface definition. Continuously monitoring can monitor for nominal surface definition due to the varying levels of compaction. The illustrative examples can also monitor relative to the part itself (as is conditions) as opposed to the tool.

The system can be used to measure and monitor the automated fiber placement head location at all times, which improves accuracy of the head. The illustrative examples can provide accurate machine-to-tool information and can compensate for any machine drifts or changes. The illustrative examples can mitigate costs by not using probe heads, and time savings over a high rate program.

The illustrative examples can compact whenever needed for as long as needed. The illustrative examples can take re-scans if needed without impacting flow. The illustrative examples enable rapid indexing at the beginning of the process.

The illustrative examples provide measurements that can compensate for part thickness. The illustrative examples account for surface quality and part build-up. The illustrative examples compensate for variation seen in composite lamination. The illustrative examples can reduce or eliminate laps/gaps that could otherwise develop towards the end of the build.

The illustrative examples provide improvements to quality and process control for composite manufacturing. The illustrative examples enable use of compactions without impacting surface quality. The illustrative examples take into account that compactions on thick parts are very sensitive to time.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system for indexing an automated fiber placement head to a surface of a substrate, comprising:
   a first measurement system comprising a first plurality of sensors configured to scan the surface of the substrate;
   a second measurement system comprising a second plurality of sensors configured to locate the automated fiber placement head; and
   a data management device configured to generate a full resolution transformation from an initial mandrel scan using sufficient measurements from the first measurement system that interpolation is not performed and determine a position of the automated fiber placement head using data from the second measurement system.

2. The system of claim 1, wherein the first plurality of sensors comprises one or more of an array of light detection and ranging devices, an array of special phase imaging sensors, an array of time-of-flight sensors, an array of stereoscopic cameras, an array of light field cameras, or an array of high resolution cameras.

3. The system of claim 1, wherein the second plurality of sensors comprises one or more of an array of light detection and ranging devices, an array of special phase imaging sensors, an array of time-of-flight sensors, an array of stereoscopic cameras, an array of light field cameras, or an array of high resolution cameras.

4. The system of claim 1 further comprising:
a tracking target connected to the automated fiber placement head, the second plurality of sensors configured to track locations of the tracking target.

5. The system of claim 1, wherein the substrate is a composite layer on a mandrel, and wherein the data management device is configured to determine thicknesses of the composite layer using measurements from the first plurality of sensors.

6. The system of claim 1, wherein the substrate is a composite layer on a mandrel, and wherein the data management device is configured to form a model of the composite layer near real-time to generation of measurements by the first measurement system.

7. The system of claim 6, wherein an accuracy of the model of the composite layer is within about 0.005 inches to the composite layer.

8. The system of claim 1, wherein the substrate is a mandrel, and wherein the data management device is further configured to index the automated fiber placement head to the mandrel using the full resolution transformation and the position of the automated fiber placement head.

9. The system of claim 1, wherein the first measurement system is configured to perform both indexing and real time monitoring.

10. The system of claim 1, wherein the second measurement system is configured to perform real time monitoring.

11. A method of performing composite lamination comprising:
performing an initial mandrel scan of a substrate within a manufacturing environment using a first measurement system;
determining a position of an automated fiber placement head within the manufacturing environment using a second measurement system;
generating a full resolution transformation using results from the initial mandrel scan including sufficient measurements that interpolation is not performed; and
beginning a layup on the substrate by the automated fiber placement head based on the full resolution transformation and the position.

12. The method of claim 11 further comprising:
wherein performing the initial mandrel scan comprises scanning a composite layer present on a mandrel.

13. The method of claim 11 further comprising:
monitoring the position of the automated fiber placement head during the layup using a second measurement system.

14. The method of claim 13 further comprising:
adjusting the position of the automated fiber placement head during the layup based on the monitoring by the second measurement system.

15. The method of claim 11 further comprising:
scanning composite material laid down by the automated fiber placement head by the first measurement system while the automated fiber placement head performs the layup.

16. The method of claim 15 further comprising:
modifying a future layup plan based on the scan of the composite material laid down by the automated fiber placement head.

17. The method of claim 11, wherein performing the initial mandrel scan comprises scanning the substrate using at least one of an array of light detection and ranging devices, an array of special phase imaging sensors, an array of time-of-flight sensors, an array of stereoscopic cameras, an array of light field cameras, or an array of high resolution cameras.

18. The method of claim 11, wherein the first measurement system is accurate to less than or equal to 0.005 inches, and wherein the initial mandrel scan is performed with a frame rate with an accuracy of 0.010 inches.

19. A method of performing composite lamination comprising:
scanning a surface of a substrate to generate first measurements using a first plurality of sensors;
locating an automated fiber placement head using a second plurality of sensors;
indexing the automated fiber placement head to the substrate based on the first measurements;
laying up composite material on the surface of the substrate using the automated fiber placement head after indexing the automated fiber placement head;
computing a full resolution transformation using results from the first measurements including sufficient measurements that interpolation is not performed; and
moving the automated fiber placement head according to the full resolution transformation.

20. The method of claim 19 further comprising:
utilizing the first measurements to modify a first layup plan for the automated fiber placement head, the first layup plan having a first tool path for laying down composite material on the substrate.

21. The method of claim 19, wherein the substrate is a mandrel, and wherein scanning the surface of the substrate comprises scanning a layup surface of the mandrel.

22. The method of claim 19, wherein the substrate is a composite layer on a mandrel, wherein scanning the surface of the substrate comprises scanning the composite layer; and further comprising:
determining thicknesses of the composite layer using measurements from the first plurality of sensors.

23. The method of claim 19, wherein the first plurality of sensors is accurate to less than or equal to 0.005 inches, and wherein the scanning is performed with a frame rate with an accuracy of 0.010 inches.

* * * * *